US012583398B2

(12) United States Patent (10) Patent No.: US 12,583,398 B2
Zhou (45) Date of Patent: Mar. 24, 2026

(54) POSITIONING ASSIST DEVICE AND POSITIONING ASSIST METHOD

(71) Applicant: Autel Intelligent Technology Corp., Ltd., Shenzhen (CN)

(72) Inventor: Junyong Zhou, Shenzhen (CN)

(73) Assignee: AUTEL INTELLIGENT TECHNOLOGY CORP., LTD., Shenzhen (CN)

( * ) Notice: Subject to any disclaimer, the term of this patent is extended or adjusted under 35 U.S.C. 154(b) by 385 days.

(21) Appl. No.: 18/282,546

(22) PCT Filed: Mar. 1, 2022

(86) PCT No.: PCT/CN2022/078626
§ 371 (c)(1),
(2) Date: Sep. 18, 2023

(87) PCT Pub. No.: WO2022/193943
PCT Pub. Date: Sep. 22, 2022

(65) Prior Publication Data
US 2024/0157888 A1 May 16, 2024

(30) Foreign Application Priority Data

Mar. 19, 2021 (CN) .......................... 202110296223.7

(51) Int. Cl.
*B60R 11/00* (2006.01)
(52) U.S. Cl.
CPC ......... *B60R 11/00* (2013.01); *B60R 2011/004* (2013.01); *B60R 2011/0052* (2013.01)
(58) Field of Classification Search
CPC .............. B60R 11/00; B60R 2011/004; B60R 2011/0052; B60R 2011/008; G01B 11/27; G01S 7/4086; G01S 13/931
(Continued)

(56) References Cited

U.S. PATENT DOCUMENTS 4,330,945 A 5/1982 Eck
4,823,470 A 4/1989 Torgny
(Continued)

FOREIGN PATENT DOCUMENTS

CN 106772320 A 5/2017
CN 108051815 A 5/2018
(Continued)

OTHER PUBLICATIONS

International Search Report of PCT Patent Application No. PCT/CN2022/078626 issued on Jun. 6, 2022.
(Continued)

*Primary Examiner* — Hai H Huynh
(74) *Attorney, Agent, or Firm* — Andrew C. Cheng

(57) ABSTRACT

A positioning assist device includes a first fixator installed on a front wheel on one side of an automobile; a second fixator installed on a rear wheel on the same side of the automobile; a first connecting rod connected between the first fixator and the second fixator, wherein the vertical plane, where a center line in a lengthwise direction of the first connecting rod is located, is parallel to the center axis plane of the automobile; a second connecting rod arranged to be perpendicular to the first connecting rod; a horizontal reference rod which is installed on the second connecting rod and can rotate around the second connecting rod; and a laser device movably installed on the horizontal reference rod, wherein the horizontal angle, relative to the horizontal reference rod, of the laser device can be adjusted to be the angle, relative to the central axis surface of the automobile, of the energy receiving and transmitting surface for installing a radar assembly when the radar assembly to be installed is installed on one side of the automobile.

15 Claims, 8 Drawing Sheets

(58) Field of Classification Search
    USPC ........................................... 296/1.01, 193.05
    See application file for complete search history.

(56)                  References Cited

U.S. PATENT DOCUMENTS 6,809,806  B1    10/2004  Carnevale
    12,158,358  B2 *  12/2024  Gilliand ................... G01C 9/28

FOREIGN PATENT DOCUMENTS

CN          210139827  U       3/2020
CN          111830474  A      10/2020
CN          112045602  A      12/2020
CN          112937458  A       6/2021
CN          215552899  U       1/2022
EP            1260832  A1     11/2002

OTHER PUBLICATIONS

The extended European search report of EP patent application No.
22770298.2 issued on Feb. 19, 2024.

* cited by examiner

10

110

120

133  132  131

130

140          120

20

210

220

230

240          220

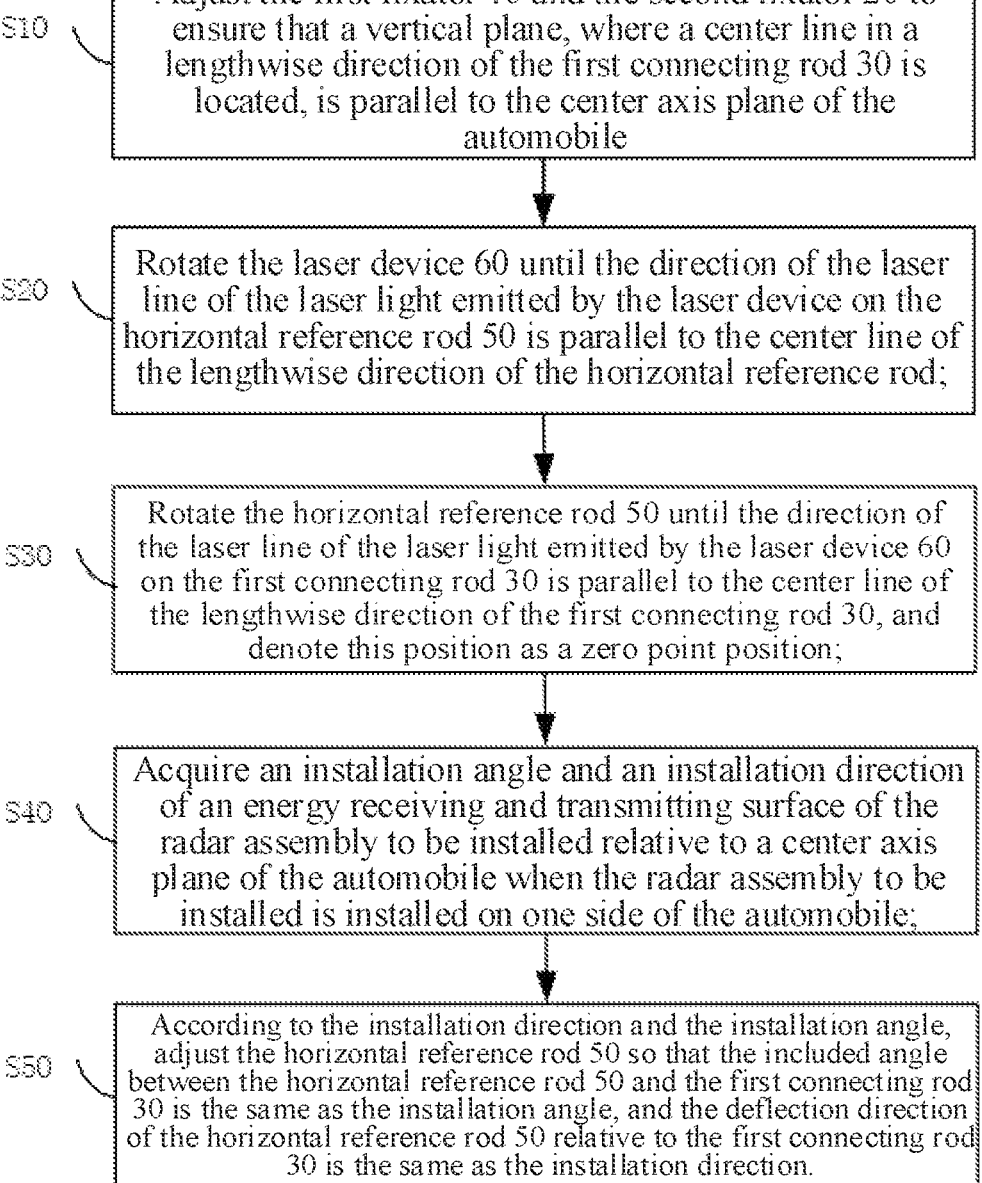

S10 — Adjust the first fixator 10 and the second fixator 20 to ensure that a vertical plane, where a center line in a lengthwise direction of the first connecting rod 30 is located, is parallel to the center axis plane of the automobile S20 — Rotate the laser device 60 until the direction of the laser line of the laser light emitted by the laser device on the horizontal reference rod 50 is parallel to the center line of the lengthwise direction of the horizontal reference rod;

S30 — Rotate the horizontal reference rod 50 until the direction of the laser line of the laser light emitted by the laser device 60 on the first connecting rod 30 is parallel to the center line of the lengthwise direction of the first connecting rod 30, and denote this position as a zero point position;

S40 — Acquire an installation angle and an installation direction of an energy receiving and transmitting surface of the radar assembly to be installed relative to a center axis plane of the automobile when the radar assembly to be installed is installed on one side of the automobile;

S50 — According to the installation direction and the installation angle, adjust the horizontal reference rod 50 so that the included angle between the horizontal reference rod 50 and the first connecting rod 30 is the same as the installation angle, and the deflection direction of the horizontal reference rod 50 relative to the first connecting rod 30 is the same as the installation direction.

FIG. 10

POSITIONING ASSIST DEVICE AND POSITIONING ASSIST METHOD

CROSS-REFERENCE TO RELATED APPLICATIONS

The present application is the National Stage application for PCT patent application Serial No. PCT/CN2022/078626, filed on Mar. 1, 2022, which claims priority to the Chinese patent application No. 202110296223.7 entitled "position-ing assist device and positioning assist method" filed on Mar. 19, 2021 to the China National Intellectual Property Administration, the entire contents of which are incorpo-rated herein by reference.

PRIOR ART

The embodiments of the present application relate to the technical field of automobiles, in particular to a positioning assist device and a positioning assist method.

BACKGROUND OF THE INVENTION

Typical automobile side components and parts installa-tions have angular requirements. For instance, the installa-tion of a radar assembly in an automobile turn assist system (Turn Assist) requires certain angular requirements based on the automobile side plane.

In the process of implementing the present invention, the inventors have found that in the prior art the angle and direction of the installation position are simply measured and fixed by manual use of an angle ruler and like measuring instruments, and these methods are inefficient and offer poor angle precision in practice, so that the installation angle cannot be guaranteed to be within the error range required by the angle of a component and a part (radar assembly). Therefore, the safety performance of an automobile cannot be guaranteed.

Therefore, it is necessary to provide a positioning assist device and a positioning assist method to solve the above problems.

SUMMARY OF THE INVENTION

Embodiments of the present invention are intended to provide a positioning assist device and a positioning assist method for improving the precision of the installation angle of a radar assembly to be installed, thereby improving the safety performance of an automobile.

The embodiments of the present invention solve the technical problems thereof by using the following technical solutions: providing a positioning assist device, including:

a first fixator installed on a front wheel on one side of an automobile;

a second fixator installed on a rear wheel on one side of the automobile, the first fixator and the second fixator being located on the same side of the automobile:

a first connecting rod connected between the first fixator and the second fixator, wherein a vertical plane, where a center line in a lengthwise direction of the first connecting rod is located, is parallel to a center axis plane of the automobile;

a second connecting rod disposed perpendicular to the first connecting rod:

a horizontal reference rod installed on the second con-necting rod and rotatable about the second connecting rod, wherein a horizontal plane, where the center line in the lengthwise direction of the horizontal reference rod is located, is perpendicular to the horizontal plane where the center line in the lengthwise direction of the first connecting rod is located;

and a laser device movably installed on the horizontal reference rod, the laser device being used for emitting laser light downwards to form a laser line on an object located below the laser device, and a horizontal angle of the laser device relative to the first connecting rod being adjustable to be an angle, relative to the center axis plane of the automobile, of an energy receiving and transmitting surface of a radar assembly to be installed when the radar assembly to be installed is installed on one side of the automobile, wherein the horizontal angle of the laser device relative to the first connecting rod is the angle between a direction of the laser line emitted by the laser device and the center line along the lengthwise direction of the first connecting rod in the horizontal plane where the center line along the lengthwise direction of the first connecting rod is located.

In some embodiments, the laser device is horizontally rotatable relative to the horizontal reference rod.

In some embodiments, the laser device may slide along the center line in the lengthwise direction of the horizontal reference rod.

In some embodiments, the horizontal reference rod is slidable relative to the second connecting rod along the lengthwise direction of the second connecting rod.

In some embodiments, the horizontal reference rod com-prises a moving part and a rotating part extending vertically from the moving part, the moving part is sleeved on the second connecting rod, the moving part can slide relative to the second connecting rod along the lengthwise direction of the second connecting rod, the rotating part can rotate relative to the second connecting rod, and the laser device is movably installed on the rotating part.

In some embodiments, the positioning assist device com-prises a first locking mechanism, wherein the first locking mechanism can lock the horizontal reference rod relative to the second connecting rod to limit the movement of the horizontal reference rod relative to the second connecting rod.

In some embodiments, the first locking mechanism com-prises a locking ring, a first locking bolt, and a first locking nut;

two ends of the locking ring are provided with a first via hole and a first through hole through which the first locking bolt passes, the first locking ring is sleeved on the moving part, and the first locking nut is used for cooperating with the first locking bolt after the first locking bolt passes through the first via hole and the first through hole.

In some embodiments, at the junction of the horizontal reference rod and the second connecting rod, one of the horizontal reference rod and the second connecting rod is provided with a first arc-shaped scale, and the other is provided with a first reference indication line.

In some embodiments, the positioning assist device fur-ther comprises a second locking mechanism for locking the laser device relative to the horizontal reference rod to limit the movement of the laser device relative to the horizontal reference rod.

In some embodiments, the second locking mechanism comprises a locking plate, a second locking bolt, and a second locking nut, wherein the locking plate is fixed to the laser device, the locking plate is provided with an arc-shaped hole for the second locking bolt to pass through, the horizontal reference rod is provided with a sliding groove for the second locking bolt to pass through, and the second locking nut is used for cooperating with the second locking bolt after the second locking bolt passes through the arc-shaped hole and the sliding groove:

wherein the second bolt can slide in an arc direction of the arc-shaped hole, and the sum of radians of the arc-shaped holes is greater than or equal to 180 degrees.

In some embodiments, a sliding block is sleeved on the horizontal reference rod, the sliding block can slide along the lengthwise direction of the horizontal reference rod, a second via hole through which the second locking bolt passes is provided on the sliding block, and the second locking bolt cooperates with the second locking nut after passing through the arc-shaped hole, the second via hole, and the sliding groove;

wherein when the second locking nut is tightened, the second locking nut abuts against the sliding block.

In some embodiments, a second arc-shaped scale is provided on the arc-shaped hole, and a second reference indication line is provided on the second locking bolt.

In some embodiments, the first fixator comprises a first installation seat and two first claw assemblies, wherein the two first claw assemblies are clamped on a hub of the front wheel, the first installation seat is located at center positions of the two first claw assemblies, and a first end of the first fixing rod is installed on the first installation seat:

the second fixator comprises a second installation seat and two second claw assemblies, wherein the second installation seat is located at the center positions of the two second claw assemblies, the two second claw assemblies are clamped to the hub of the rear wheel, and a second end of the first fixing rod is installed on the second installation seat.

Embodiments of the present invention further provide a positioning assist method including the above-described positioning assist device, the method comprising:

adjusting the first fixator and the second fixator to ensure that the vertical plane, where the center line in the lengthwise direction of the first connecting rod is located, is parallel to the center axis plane of the automobile:

rotating the laser device until the direction of the laser line of a laser light emitted by the laser device on the horizontal reference rod is parallel to the center line of the lengthwise direction of the horizontal reference rod;

rotating the horizontal reference rod until the direction of the laser line of the laser light emitted by the laser device on the first connecting rod is parallel to the center line of the lengthwise direction of the first connecting rod, and denoting this position as a zero point position;

acquiring an installation angle and an installation direction of the energy receiving and transmitting surface of the radar assembly to be installed relative to the center axis plane of the automobile when the radar assembly to be installed is installed on one side of the automobile; and according to the installation direction and the installation angle, adjusting the horizontal reference rod so that an included angle between the horizontal reference rod and the first connecting rod is the same as the installation angle, and the deflection direction of the horizontal reference rod relative to the first connecting rod is the same as the installation direction, wherein the first connecting rod and an adjusted horizontal reference rod are used to assist in installing the radar assembly to be installed.

In some embodiments, the step of according to the installation direction and the installation angle, adjusting the horizontal reference rod so that an included angle between the horizontal reference rod and the first connecting rod is the same as the installation angle further comprises:

horizontally rotating the laser device in a direction opposite to the installation direction by the installation angle; and rotating the horizontal reference rod until the direction of the laser line of the laser light emitted by the laser device on the first connecting rod is parallel to the center line of the lengthwise direction of the first connecting rod.

The embodiments of the present invention have the following beneficial effects.

Embodiments of the present invention provide a positioning assist device and a positioning assist method for determining the installation position of a radar assembly to be installed on a side surface of one side of an automobile by adjusting the laser device and the horizontal reference rod.

BRIEF DESCRIPTION OF DRAWINGS

One or more embodiments are exemplified by the drawings in the accompanying drawings corresponding thereto. These exemplified descriptions do not constitute a limitation on the embodiments. Elements in the drawings having the same reference number designations are illustrated as similar elements, and unless otherwise particularly stated, the drawings do not constitute a proportional limitation.

FIG. 10 is a schematic flow diagram of a positioning assist method provided by another embodiment of the present invention;

DETAILED DESCRIPTION OF THE INVENTION

Figure 1:
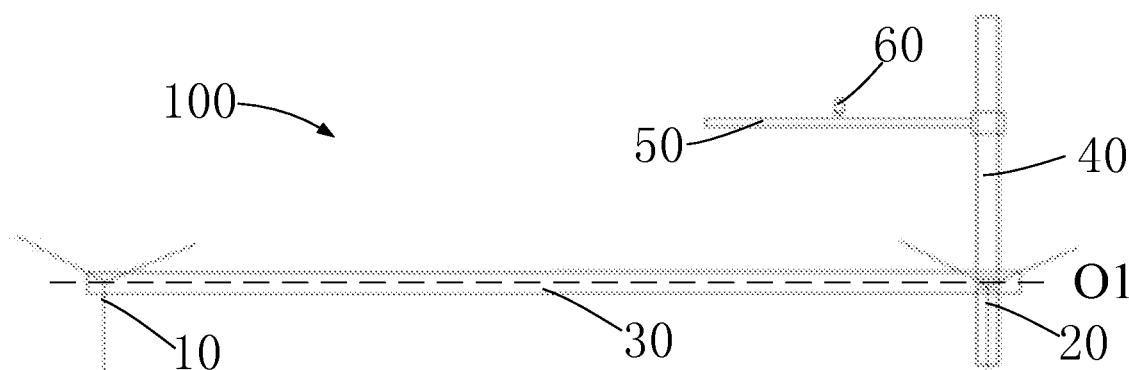
FIG. 1 is a schematic planar diagram of a positioning assist device provided by one of the embodiments of the present invention.

In order to make the present invention readily understood, a more detailed description of the present invention will be rendered with reference to the appended drawings and specific embodiments. It should be noted that when an element is referred to as being "secured" to another element, it can be directly on the other element or one or more intervening elements may be present therebetween. When one element is referred to as being "connected" to another element, it can be directly connected to the other element or one or more intervening elements may be present therebetween. In the description, the orientation or positional relationships indicated by the terms used herein "up", "down", "inside", "outside", "vertical", "horizontal" etc. are based on the orientation or positional relationship shown in the drawings, and are only for the convenience of describing the invention and simplifying the description, rather than indicating or implying that the referred device or element must have a specific orientation, or be constructed and operated in a specific orientation, and therefore cannot be construed as a limitation of the present invention. Furthermore, the terms "first", "second", etc. are only used for descriptive purposes and are not to be construed as indicating or implying relative importance.

Unless defined otherwise, all technical and scientific terms used in the specification have the same meaning as commonly understood by one of ordinary skill in the art to which the present invention belongs. The terminology used in the description of the present invention is for the purpose of describing specific embodiments only and is not intended to limit the present invention. As used herein, the term "and/or" includes any and all combinations of one or more of the associated listed items.

Furthermore, the technical features involved in the different embodiments of the present invention described below can be combined with each other as long as they do not conflict with each other.

Figure 2:
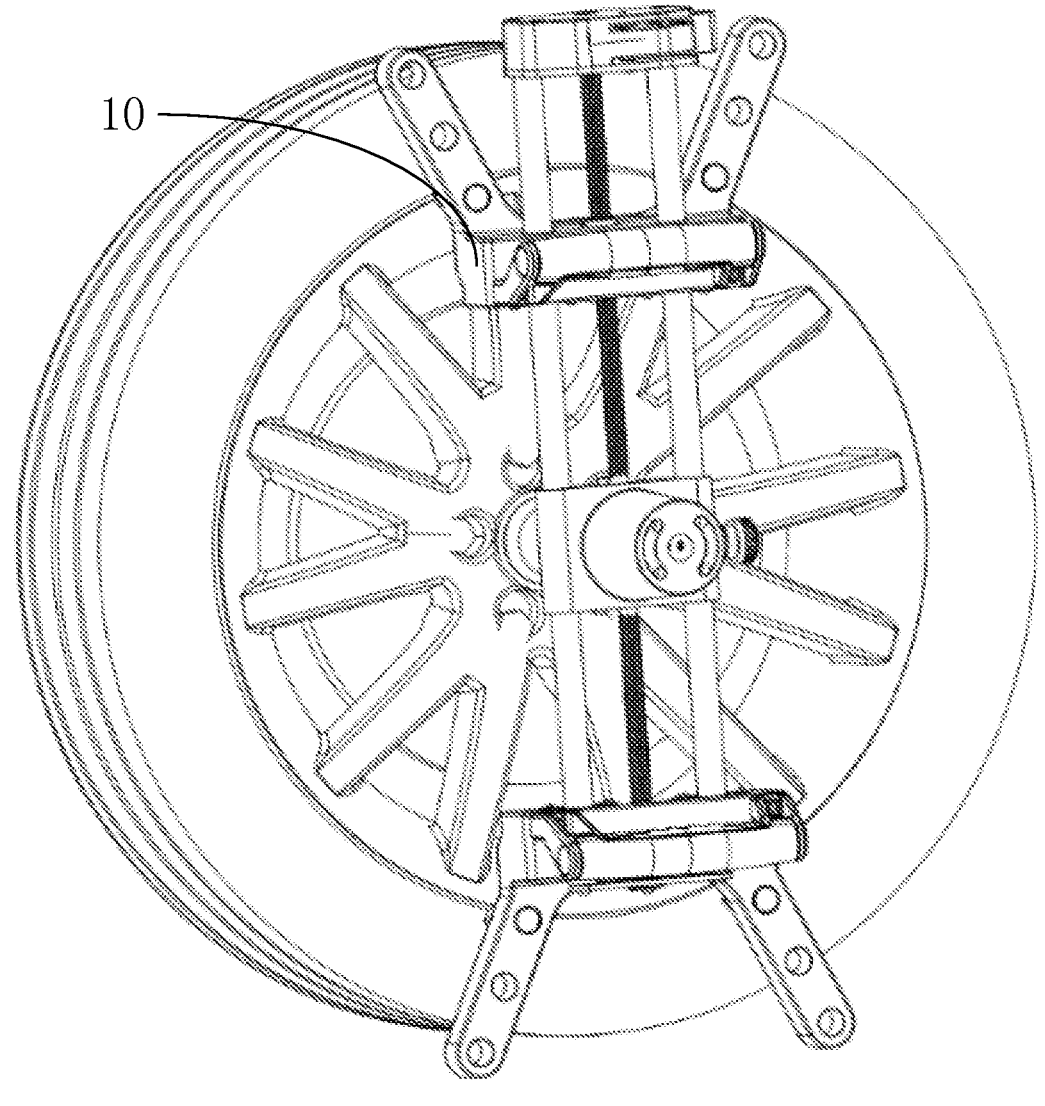
FIG. 2 is a schematic diagram of an application scenario of a first fixator in the positioning assist device shown in FIG. 1.

With reference to FIG. 1, a positioning assist device is provided by an embodiment of the present invention, comprising a first fixator 10, a second fixator 20, a first connecting rod 30, a second connecting rod 40, a horizontal reference rod 50, and a laser device 60. The first fixator 10 is installed on a front wheel on one side of an automobile (as shown in FIG. 2), the second fixator 20 is installed on a rear wheel on one side of the automobile, and the first fixator 10 and the second fixator 20 are located on the same side of the automobile. The first connecting rod 30 is connected between the first fixator 10 and the second fixator 20. A vertical plane where a center line O1 along the lengthwise direction of the first connecting rod 30 is located is parallel to a center axis plane of the automobile. The second connecting rod 40 is disposed perpendicular to the first connecting rod 30. The horizontal reference rod 50 is installed on the second connecting rod 40 and is rotatable around the second connecting rod 40, and a horizontal plane where the center line along the lengthwise direction of the horizontal reference rod 50 is located is perpendicular to the center axis plane of the automobile. The laser device 60 is movably installed on the horizontal reference rod 50, the laser device 60 is used for emitting laser light downward to form a laser line on an object located under the laser device 60, and the horizontal angle of the laser device 60 relative to the horizontal reference rod 50 can be adjusted to be the angle, relative to the center axis plane of the automobile, of the energy receiving and transmitting surface of a radar assembly to be installed when the radar assembly to be installed is installed on one side of the automobile. The horizontal angle of the laser device 60 relative to the first connecting rod 30 is the angle between the direction of the laser line emitted by the laser device 60 and the center line along the lengthwise direction of the first connecting rod 30 in the horizontal plane where the center line along the lengthwise direction of the first connecting rod 30 is located.

It needs to be noted that the central axial plane of the automobile means a plane perpendicular to the ground and passing through the middle points of the two front wheels and the middle points of the two rear wheels of the automobile.

The energy receiving and transmitting surface of the radar assembly to be installed means the antenna plane of the radar or a plane parallel to the antenna plane of the radar.

It could be understood that one side of the automobile includes places under a rear view mirror of the automobile, or at a side guard rail of the automobile.

Figure 3:
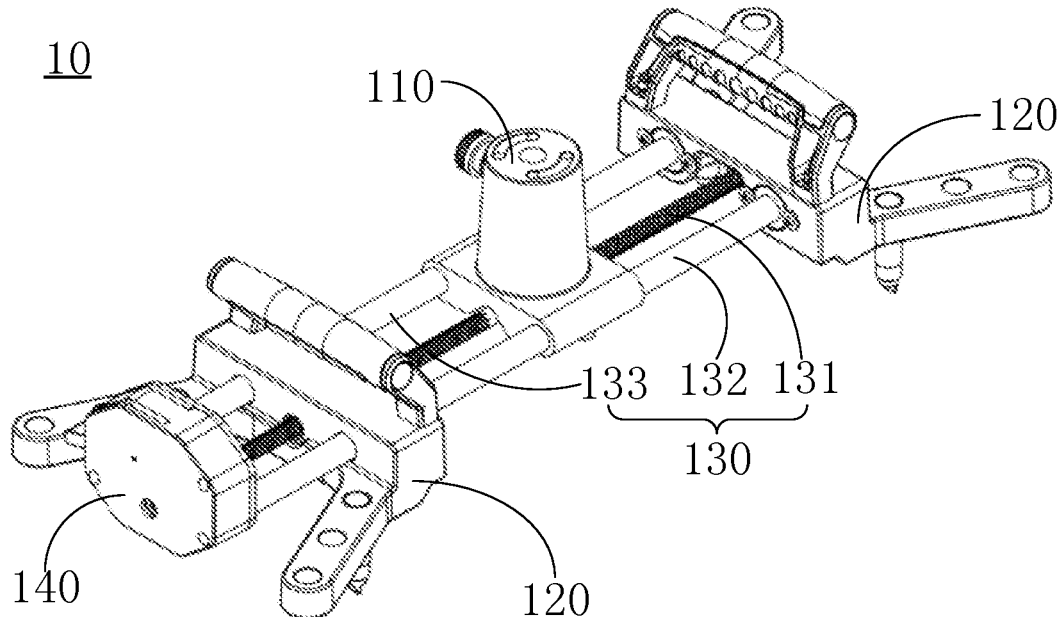
FIG. 3 is a schematic structural diagram of the first fixator in the positioning assist device shown in FIG. 1.
Figure 4:
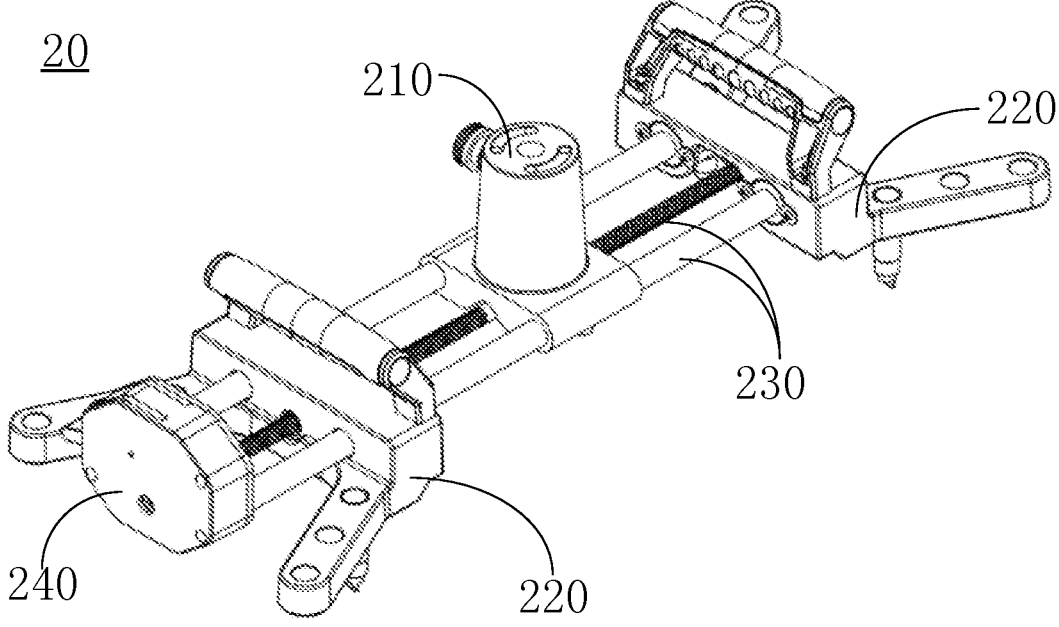
FIG. 4 is a schematic structural diagram of a second fixator in the positioning assist device shown in FIG. 1.

Referring to FIGS. 3 and 4 together, in some embodiments, the first fixator 10 and the second holder 20 may have the same structure, and both may be a hub clamping device. For example, the first fixator 10 comprises a first installation seat 110, two first claw assemblies 120, a first drive module 130, and a first locking module 140. The first installation seat 110 is located at the central positions of the two first claw assemblies 120, and a first end of the first connecting rod 30 is installed on the first installation seat 110. The two first claw assemblies 120 are clamped to the hub of the front wheel; the two first claw assemblies 120 are installed on the first drive module 130; the first drive module 130 is used for synchronously driving the two first claw assemblies 120 to move, so that the two first claw assemblies 120 can move towards or away from each other synchronously relative to the first installation seat 110, so as to adapt to hubs of different sizes; the first locking module 140 is used for locking the first drive module 130, so as to ensure that the two first claw assemblies 120 are fixed.

The second fixator 20 comprises a second installation seat 210, two second claw assemblies 220, a second drive module 230, and a second locking module 240; the second installation seat 210 is located at the central positions of the two second claw assemblies 220; the second end of the first connecting rod 30 is installed on the second installation seat 210; the two second claw assemblies 220 are clamped to the hub of the rear wheel; the two second claw assemblies 220 are installed on the second drive module 230; the second drive module 230 is used for synchronously driving the two second claw assemblies 220 to move so that the two second claw assemblies 220 can move towards or away from each other synchronously relative to the second installation seat 210 so as to adapt to hubs of different sizes, and the second locking module 240 is used for locking the second drive module 230 so as to ensure that the two second claw assemblies 220 are fixed.

The first drive module 130 and the second drive module 230 may be a lead screw mechanism, and the first drive module 130 is described herein as an example.

For example, the first drive module 130 includes a guide assembly for guiding the movement of the two first claw assemblies 120, and a driving member 131 for synchronously driving the two first claw assemblies 120 toward or away from each other.

Figure 5:
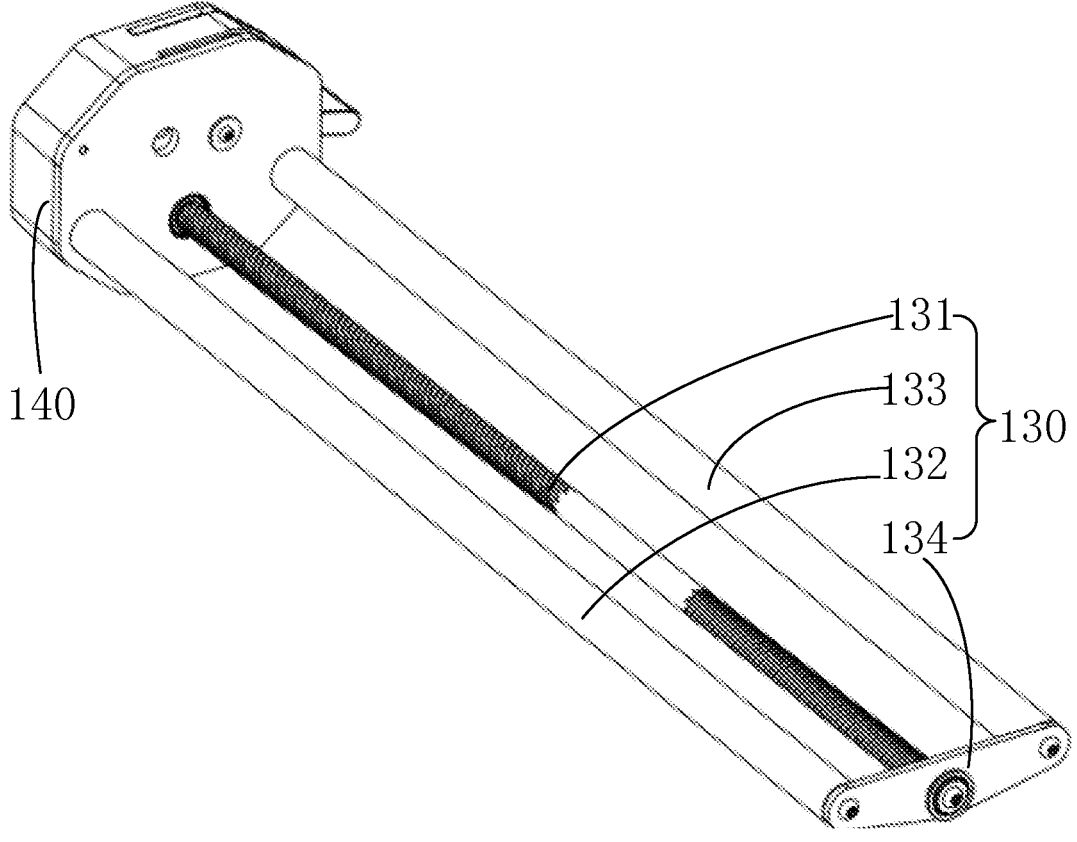
FIG. 5 is a schematic structural diagram of a first drive module in the first fixator shown in FIG. 3.

Specifically, referring to FIG. 5, the driving member 131 may be a driving rod including a left-hand threaded portion, a right-hand threaded portion, and a connecting portion connecting the left-hand threaded portion and the right-hand threaded portion, the left-hand threaded portion and the right-hand threaded portion being oppositely provided. The left-handed threaded portion is provided with a left-handed thread, and the right-handed threaded portion is provided with a right-handed thread. One of the first claw assemblies

120 is threadedly connected to the left-handed threaded portion, and the other of the first claw assemblies 120 is threadedly connected to the right-handed threaded portion. Therefore, when the driving member 131 is rotated, the two first claw assemblies 120 move synchronously by the same distance, so as to ensure that the first installation seat 110 is always in the middle of the two first claw assemblies 120, and ensure that the central axis of the first installation seat 110 coincides with the central axis of its the installation hub.

The guide assembly comprises a first guide post 132, a second guide post 133, and a connecting block 134. The first guide post 132 and the second guide post 133 are respectively located on two sides of the driving member 131, one of the first claw assemblies 120 is installed on one end of the first guide post 132 and the second guide post 133, and the other of the first claw assemblies 120 is installed on the other end of the first guide post 132 and the second guide post 133.

The driving member 131 is connected to the connecting block 134. Specifically, one end of the first guide post 132 passes through the two first claw assemblies 120 in sequence and is then connected to the connecting block 134, and the other end of the first guide post 132 is connected to the locking module 140. Likewise, one end of the second guide post 133 passes through the two first claw assemblies 120 in sequence and is then connected to the other end of the connecting block 134, and the first guide post 132 and the second guide post 133 are parallel to each other. Therefore, the two first claw assemblies 120 are movable along the first guide post 132 and the second guide post 133 to ensure that the two first claw assemblies 120 move along a preset path.

One end of the driving member 131 is connected to the connecting block 134, and the other end is connected to the locking module 140.

It could be understood that the guide assembly 210, in addition to the form of the first guide post 132, the second guide post 133, and the connecting block 134 described above, may be in the form of at least two pairs of sliding blocks and two guide rails, for example, a sliding block secured to the first claw assembly and a sliding block slidably connected to a guide rail.

For the structure of the first locking module 140, the embodiment of the present application does not have any limitations as long as the rotation of the driving member 131 can be limited.

The first end of the first connecting rod 30 is installed on the first installation seat 110, and the second end of the first connecting rod 30 is installed on the second installation seat 210; specifically, a first installation hole for installing the first connecting rod 30 is provided on the first installation seat 110, and the first installation hole is coaxial with the central axis of the first installation seat 110; a second installation hole for installing the first connecting rod 30 is provided on the second installation seat 210, and the second installation hole is coaxial with the central axis of the second installation seat 210, so as to ensure that the vertical plane, where the center line in the lengthwise direction of the first fixing rod 30 is located, is parallel to the center axis plane of the automobile.

The first installation hole and the second installation hole may both be threaded holes, two ends of the first connecting rod 30 may be respectively provided with threads, and the first connecting rod 30 is fixed between the first installation seat 110 and the second installation seat 120 by the cooperation of the first connecting rod 30 with the first installation hole and the second installation hole.

Of course, the structures of the first fixator 10 and the second fixator 20 may be different as long as it suffices that the first fixator 10 and the second fixator 20 can be clamped to a hub of an automobile, and the vertical plane, where the center line in the lengthwise direction of the first connecting rod 30 is located, is parallel to the center axis plane of the automobile.

In some embodiments, the second connecting rod 40 is installed on the second installation seat 120 and perpendicular to the first connecting rod 30. In other embodiments, the second connecting rod 40 may be installed on the ground or other devices as long as it is ensured that the second connecting rod 40 is perpendicular to the first connecting rod 30, without any limitation by this embodiment of the present application.

In some embodiments, the horizontal reference rod 50 may rotate only about the second connecting rod 40, or alternatively, the horizontal reference rod 50 may both rotate around the second connecting rod 40 and slide relative to the second connecting rod 40 along the lengthwise direction of the second connecting rod 40.

The horizontal reference rod 50 may have an L-shaped, a T-shaped, a linear-shaped, or like structures.

This application takes the horizontal reference rod 50 as a T-shape as an example for explanation.

Figure 6:
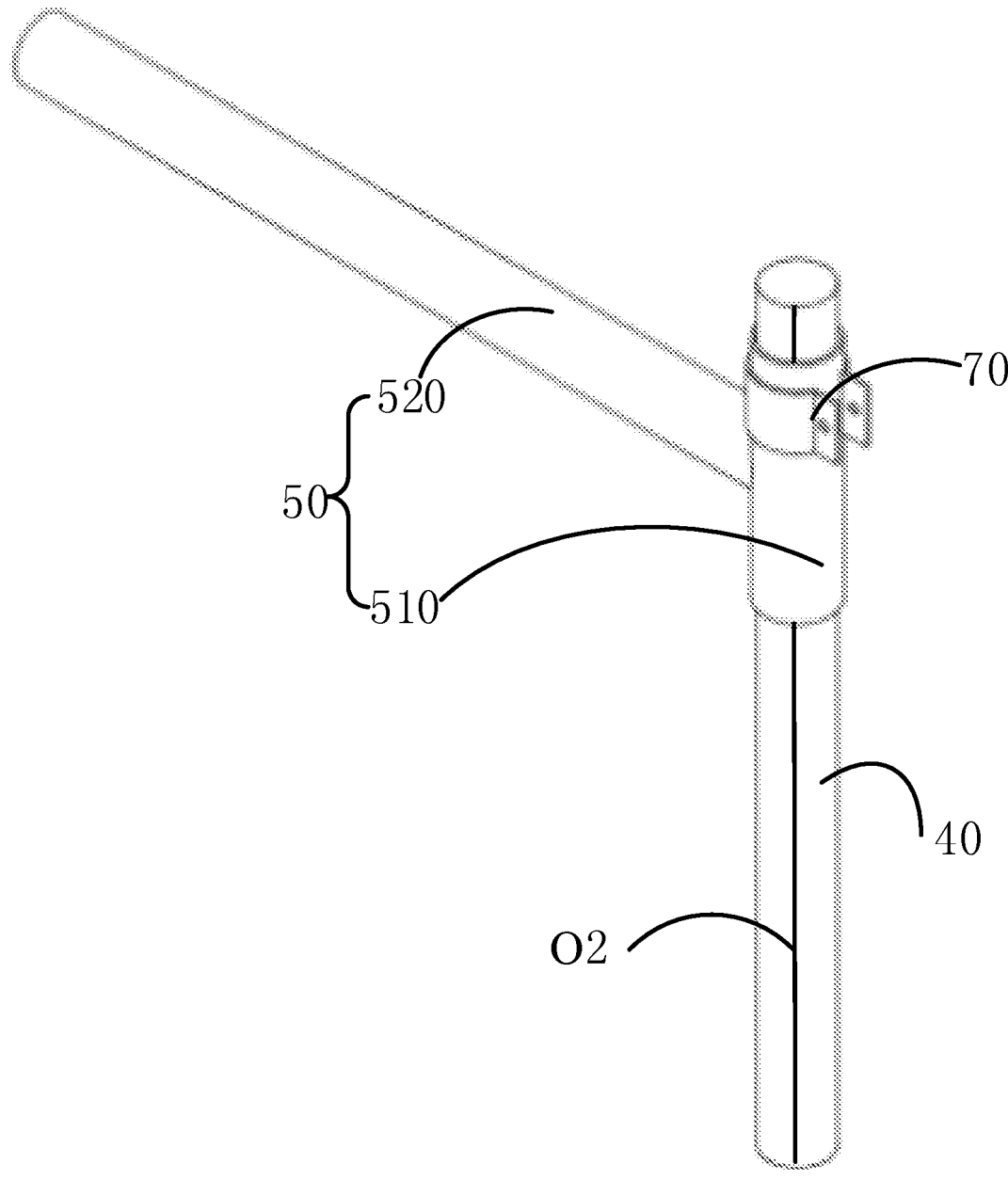
FIG. 6 is a schematic diagram of the installation of a horizontal reference rod and a second connecting rod in the positioning assist device shown in FIG. 1.

Referring to FIG. 6, the horizontal reference rod 50 includes a moving part 510 sleeved on the second connecting rod 40 and rotatable around the second connecting rod 40, and a rotating part 520 vertically extending along the moving part 510. The laser device 60 is movably installed on the rotating part 520.

It could be understood that when one end of the moving part 510 is a closed end and the other end is an open end, the moving part 510 is sleeved on the second connecting rod 40 and the closed end of the moving part 510 abuts the top of the second connecting rod 40. At this time, the horizontal reference rod 50 can only rotate around the second connecting rod 40. When two ends of the moving part 510 are open ends, the moving part 510 is sleeved on the second connecting rod 40 and can slide along the second connecting rod 40. At this time, the horizontal reference rod 50 can both rotate around the second connecting rod 40 and slide relative to the second connecting rod 40 along the lengthwise direction of the second connecting rod 40.

The present application takes the situation that the horizontal reference rod 50 can both rotate around the second connecting rod 40 and slide relative to the second connecting rod 40 along the lengthwise direction of the second connecting rod 40 as an example.

In some embodiments, the positioning assist device includes a first locking mechanism 70 that can lock the horizontal reference rod 50 relative to the second connecting rod 40 to limit movement of the horizontal reference rod 50 relative to the second connecting rod 40.

It needs to be noted that limiting the movement of the horizontal reference rod 50 relative to the second connecting rod 40 means that the horizontal reference rod 50 is restricted from rotating and sliding relative to the second connecting rod 40.

The first locking mechanism 70 comprises a locking ring, a first locking bolt, and a first locking nut. The first locking ring is sleeved on the moving part 510, the two ends of the locking ring are provided with a first via hole and a first through hole through which the first locking bolt passes, and the first locking nut is used for cooperating with the first locking bolt after the first locking bolt passes through the first via hole and the first through hole.

The first locking mechanism 70 achieves the locking of the horizontal reference rod 50 when the first locking nut is tightened; when the horizontal reference rod 50 needs to rotate or slide relative to the second connecting rod 40, it only requires the first locking bolt to be loosened.

Figure 7:
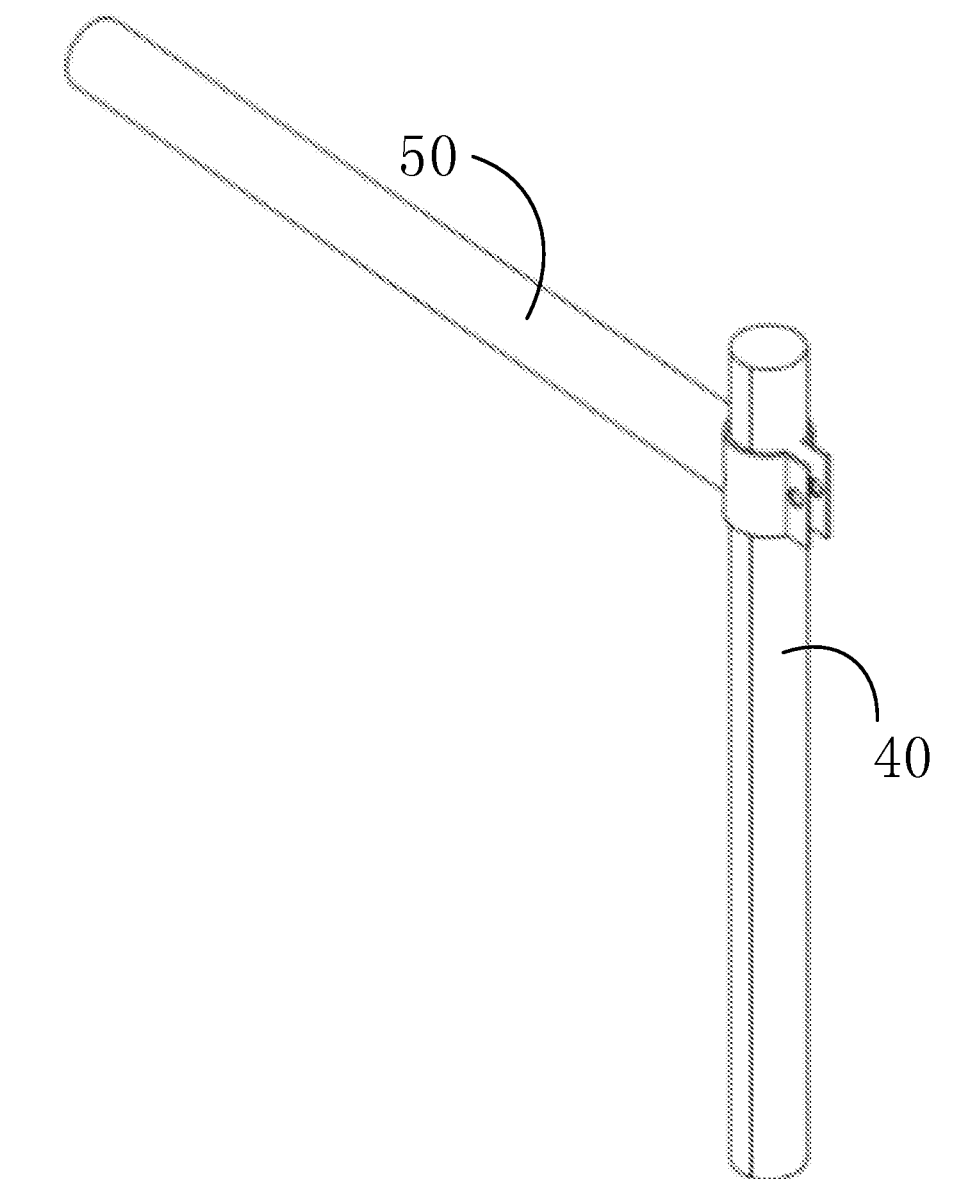
FIG. 7 is another schematic diagram of the installation of the horizontal reference rod and the second connecting rod in the positioning assist device shown in FIG. 1.
Figure 8:
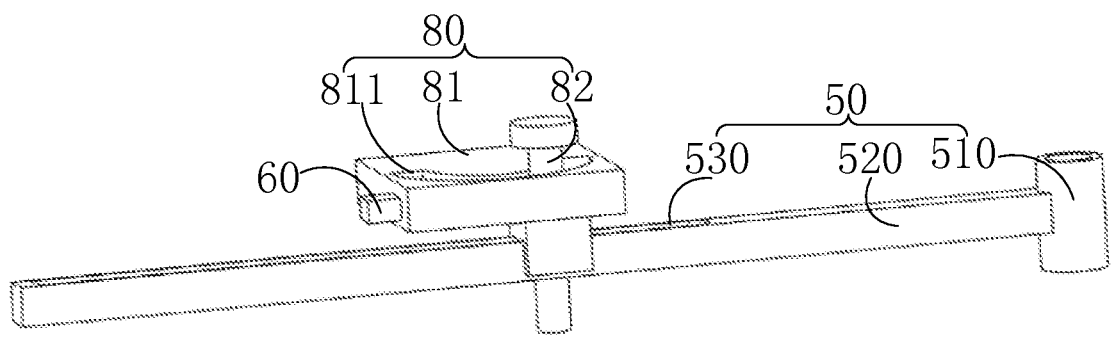
FIG. 8 is a schematic diagram of the installation of the horizontal reference rod and a laser device in the positioning assist device shown in FIG. 1.

It is worth noting that, in some embodiments, the first locking ring may be omitted, and the moving part may be provided in an open-loop structure that constitutes the locking ring described above, as shown in FIG. 7.

It could be understood that the first locking mechanism 70 can also be other mechanisms, for example, the first locking mechanism comprises two locking nuts, the outer surface of the connecting rod 40 is provided with threads, the two locking nuts are respectively screwed on two ends of the connecting rod, and the moving part is between two nuts. When the two nuts are relatively tightened and abut against the moving part, the horizontal reference rod 50 can be locked. When the horizontal reference rod 50 needs to rotate or slide relative to the second connecting rod 40, the two locking nuts are loosened, and at this time, the horizontal reference rod is rotatable about the second connecting rod 40, and the horizontal reference rod is slidable along the second connecting rod 40 between two locking nuts.

It could be understood that the configuration of the first locking mechanism 70 is not limited to the embodiments of the present invention, and that other means restricting the rotation and sliding of the horizontal reference rod 50 are included in the embodiments of the present application.

In some embodiments, at the junction of the horizontal reference rod 50 and the second connecting rod 40, one of the horizontal reference rod 50 and the second connecting rod is provided with a first arc-shaped scale, and the other is provided with a first reference indication line O2. For example, the moving part 510 is provided with the first arc-shaped scale, and the second connecting rod 40 is provided with the first reference indication line O2 (the first reference indication line O2 can be a straight line located on the outer surface of the second connecting rod 40 and extend from the top of the second connecting rod to the bottom of the second connecting rod, as shown in FIG. 6) so that when the horizontal reference rod 50 is rotated relative to the second connecting rod 40, the angle at which the horizontal reference rod 50 is rotated can be known according to the first reference indication line O2 and the first arc-shaped scale on the moving part.

In some embodiments, a distance scale is provided on the first reference indication line O2 so that when the horizontal reference rod 50 slides relative to the second connecting rod 40, the distance that the horizontal reference rod 50 slides can be known according to the distance scale on the first reference indication line O2.

It could be understood that the first reference indication line O2 may also be provided on the moving part. The second connecting rod 40 is provided with an arc scale, which extends from the top of the second connecting rod to the bottom of the second connecting rod for easy observation.

The horizontal angle of the laser device 60 relative to the first connecting rod 30 can be adjusted by the movement of the horizontal reference rod 50 relative to the second connecting rod 40.

The laser device 60 is movably installed on the horizontal reference rod 50. In the embodiments of the present invention, the laser device 60 is movably installed on the horizontal reference rod 50, meaning that the laser device 60 is horizontally rotatable relative to the horizontal reference rod 50.

For example, the laser device 60 may be rotated horizontally relative to the horizontal reference rod 50, and the positioning assist device further includes a second locking mechanism 80 for locking the laser device 60 relative to the horizontal reference rod 50 to limit the movement (e.g. horizontal rotation) of the laser device 60 relative to the horizontal reference rod 50.

The mechanisms for horizontally rotating and locking the laser device 60 relative to the horizontal reference rod 50 can be the same mechanism. For example, the second locking mechanism 80 comprises a locking plate 81, a second locking bolt 82, and a second locking nut. The locking plate 81 is connected to the laser device 60, the locking plate 81 is perpendicular to the center axis plane of the automobile, the locking plate 81 is provided with an arc-shaped hole 811 for the second locking bolt 82 to pass through, and the horizontal reference rod 50 is provided with a sliding groove 530 for the second locking bolt 82 to pass through, the second locking bolt 82 is slidable along the sliding groove 530 provided along the lengthwise direction of the horizontal reference rod 50, and the second locking nut is used for cooperating with the second locking bolt 82 after the second locking bolt 82 passes through the arc-shaped hole 811 and the sliding groove 530. The second locking bolt 82 can slide along the arc direction of the arc-shaped hole 811, and the sum of the radians of the arc-shaped hole 811 is greater than or equal to 180 degrees, so that the horizontal angle of the laser device 60 relative to the horizontal reference rod 50 can be adjusted by the second locking bolt 82 sliding along the arc direction of the arc-shaped hole 811.

The locking of the laser device 60 relative to the horizontal reference rod 50 can be achieved when the second locking nut is tightened, and the second locking nut is loosened when the laser device 60 needs to be rotated horizontally relative to the horizontal reference rod 50.

It could be understood that the connection of the laser device 60 to the locking plate 81 may be a fixed connection or a movable connection. For example, the laser device 60 being fixedly connected to the locking plate 81, or the laser device 60 being movably connected to the locking plate 81, e.g. hinged. When the laser device is movably connected (e.g. hinged) to the locking plate 81, the laser device can move relative to the locking plate 81 under an external force.

In some embodiments, the arc-shaped hole 811 is provided with a second arc-shaped scale, the second locking bolt 82 is provided with a second reference indication line, and the horizontal angle of rotation of the laser device 60 relative to the horizontal reference rod 50 can be known through the second arc-shaped scale of the arc-shaped hole 811 and the second reference indication line.

In some embodiments, the laser device 60 can also slide along the lengthwise direction of the horizontal reference rod 50; in order to limit the laser device 60 to slide along other directions, the rotating part 520 of the horizontal reference rod 50 is of a square structure, the locking plate 81 is parallel to the top surface of the rotating part 520, the rotating part 520 is sleeved with a sliding block 90, the sliding block 90 can slide along the lengthwise direction of the horizontal reference rod 50, the sliding block 90 is provided with a second via hole through which the second locking bolt 82 passes, and the second locking bolt passes through the arc-shaped hole, the second via hole, and the sliding groove 530, and then cooperates with the second locking nut. When the second locking nut is tightened, the locking plate 81 and the sliding block 90 remain relatively fixed, and the sliding block 90 can drive the second locking device 80 and the laser device 60 to slide along the lengthwise direction of the horizontal reference rod 50.

It is worth noting that when the second locking nut is tightened, the second locking nut abuts against the sliding block.

To ensure the removal of the sliding block from the top of the horizontal reference rod, one of the side of the horizontal reference rod and one side of the sliding block opposite the side of the horizontal reference is provided with a convex rib and the other is provided with a groove for receiving the convex rib. The convex rib can slide along the groove.

It could be understood that the sliding block 80 can only slide along the lengthwise direction of the horizontal reference rod under an external force.

Figure 9:
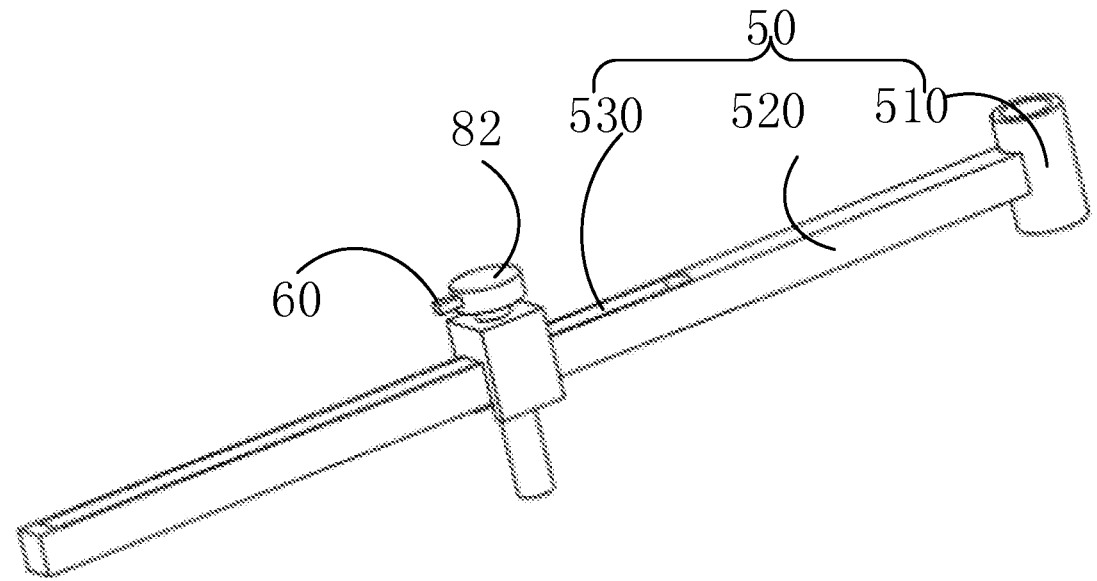
FIG. 9 is another schematic diagram of the installation of the horizontal reference rod and the laser device in the positioning assist device shown in FIG. 1.

In other embodiments, the locking plate 81 may be omitted. As shown in FIG. 9, the second locking mechanism 80 comprises a second locking bolt 82 and a second locking nut, the laser device 60 is installed on the second locking bolt 82, the second locking bolt passes through the second via hole and the sliding groove 530 and then cooperates with the second locking nut, and the horizontal angle of the laser device 60 relative to the horizontal reference rod 50 can be adjusted by rotating the second locking bolt. In this manner, at the junction of the second bolt 82 and the sliding block 90, one of the second locking bolt 82 and the sliding block 90 is provided with a second arc-shaped scale and the other is provided with a second reference indication line. Similarly, the laser device 60 may be movably or fixedly installed on the second locking bolt 82.

The laser device 60 can slide along the horizontal reference rod 50 in order to enable the laser light emitted by the laser device 60 to form a laser line on the first connecting rod 30, so as to prevent the laser line from being formed on the first connecting rod 30 due to the shielding of the horizontal reference rod 50 when the laser device 60 emits laser light downward.

Of course, in order to ensure that the laser light emitted from the laser device 60 can form a laser line on the first connecting rod 30, the length of the first connecting rod is longer than the length of the rotating part 520 of the horizontal reference rod 50.

It should be understood that the mechanism by which the laser device 60 moves and locks relative to the horizontal reference rod 50 is not limited to the embodiments of the present application, and that other mechanisms that enable the laser device to move and lock relative to the horizontal reference rod are included in the embodiments of the present application.

During a specific implementation, loosening the second locking nut, rotating the laser device 60 until the direction of the laser line of the laser device 60 on the horizontal reference rod 50 is parallel to the center line of the lengthwise direction of the horizontal reference rod 50, screwing the second locking nut, and recording the angle of the second reference indication line relative to the second arc-shaped scale at this moment as A1; lossening the first locking nut, rotating the horizontal reference rod 50 until the direction of the laser line of the laser light emitted by the laser device 60 on the first connecting rod 30 is parallel to the center line O1 of the lengthwise direction of the first connecting rod 30, screwing the second locking nut, recording the angle of the first reference indication line O2 relative to the first arc-shaped scale at this moment as B1, and designating the position as a zero point position; acquiring an installation angle and an installation direction of an energy receiving and transmitting surface of the radar assembly to be installed relative to a center axis plane of the automobile, lossening the second locking nut, horizontally rotating the laser device 60 the installation angle in a direction opposite to the installation direction, and screwing the second locking nut, and recording an angle of the second reference indication line relative to the second arc-shaped scale at this moment as A2; lossening the first locking nut, then rotating the horizontal reference rod 50 until the direction of the laser line of the laser light emitted by the laser device 60 on the first connecting rod 30 is parallel to the center line of the lengthwise direction of the first connecting rod 30, screwing the second locking nut, and recording the angle of the first reference indication line O2 relative to the first arc-shaped scale at this moment as B2.

At this time, according to the position of the horizontal reference rod 50 relative to the first connecting rod 30, the side position of the radar assembly to be installed on one side of the automobile can be determined, namely, the angle of the energy receiving and transmitting surface of the radar assembly relative to one side of the automobile is determined.

It could be understood that the difference between A1 and A2 and the difference between B1 and B2 are both the installation angles.

In the above implementation mode, the sliding block 90 can be slid according to the requirements.

Figure 11:
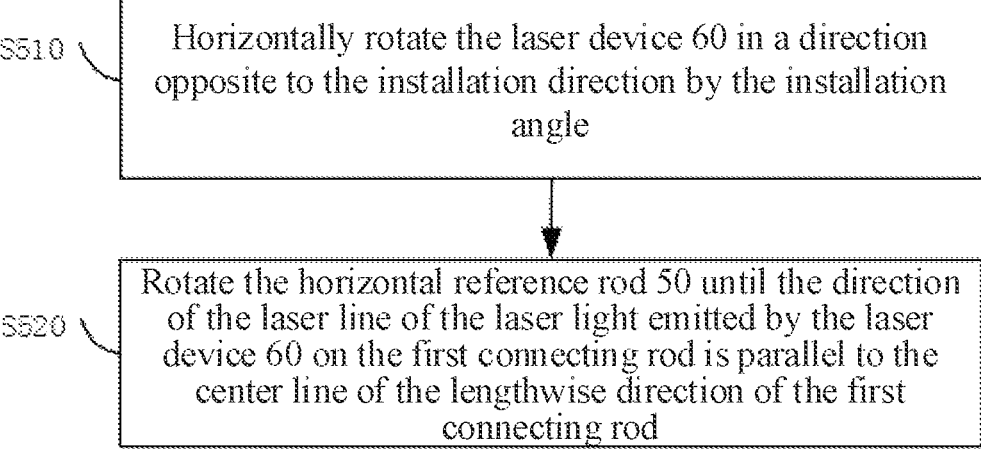
FIG. 11 is a schematic sub-flow diagram of step S50 in the positioning assist method shown in FIG. 10.

Referring to FIGS. 10 and 11 together, embodiments of the present application provide a positioning assist method including the above-described positioning assist device for assisting in the installation of the above-described radar assembly to be installed.

Step S10, adjust the first fixator 10 and the second fixator 20 to ensure that a vertical plane, where a center line in a lengthwise direction of the first connecting rod 30 is located, is parallel to the center axis plane of the automobile.

Step S20, rotate the laser device 60 until the direction of the laser line of the laser light emitted by the laser device on the horizontal reference rod 50 is parallel to the center line of the lengthwise direction of the horizontal reference rod.

Step S30, rotate the horizontal reference rod 50 until the direction of the laser line of the laser light emitted by the laser device 60 on the first connecting rod 30 is parallel to the center line of the lengthwise direction of the first connecting rod 30, and denote this position as a zero point position.

Step S40, acquire an installation angle and an installation direction of an energy receiving and transmitting surface of the radar assembly to be installed relative to a center axis plane of the automobile when the radar assembly to be installed is installed on one side of the automobile.

It needs to be noted that the installation angle of an energy receiving and transmitting surface of the radar assembly to be installed relative to a center axis plane of the automobile refers to a horizontal angle of the laser device 60 relative to the first connecting rod 30. The installation direction of an energy receiving and transmitting surface of the radar assembly to be installed relative to a center axis plane of the automobile refers to the deflection direction of the laser device relative to the first connecting rod. The horizontal angle of the laser device 60 relative to the first connecting rod 30 is an angle between the direction of the laser line emitted by the laser device and a center line O1 along the lengthwise direction of the first connecting rod in a horizontal plane where the center line along the lengthwise direction of the first connecting rod 30 is located.

Step S50, according to the installation direction and the installation angle, adjust the horizontal reference rod 50 so that the included angle between the horizontal reference rod 50 and the first connecting rod 30 is the same as the installation angle, and the deflection direction of the horizontal reference rod 50 relative to the first connecting rod 30 is the same as the installation direction.

It needs to be noted that the first connecting rod 30 and the adjusted horizontal reference rod 50 are used to assist in installing the radar assembly to be installed.

It needs to be noted that the step of according to the installation direction and the installation angle, adjusting the horizontal reference rod 50 so that the included angle between the horizontal reference rod 50 and the first connecting rod is the same as the installation angle further includes:

step S510, horizontally rotating the laser device 60 in a direction opposite to the installation direction by the installation angle, and step S520, rotating the horizontal reference rod 50 until the direction of the laser line of the laser light emitted by the laser device 60 on the first connecting rod is parallel to the center line of the lengthwise direction of the first connecting rod.

Embodiments of the present invention provide a positioning assist device and method for determining the installation position of a radar assembly to be installed on a side surface of one side of an automobile by adjusting the laser device and the horizontal reference rod. The operation is simple, convenient, and fast, and the installation precision is high.

Finally, it should be noted that: the above embodiments are merely illustrative of the technical solutions of the present invention, rather than limiting it; combinations of technical features in the above embodiments or in different embodiments are also possible under the idea of the present invention, and the steps can be implemented in any order; there are many other variations of the different aspects of the present invention as described above, which are not provided in detail for the sake of brevity; although the present invention has been described in detail with reference to the foregoing embodiments, those of ordinary skills in the art will appreciate that the technical solutions disclosed in the above-mentioned embodiments can still be modified, or some of the technical features thereof can be replaced by equivalents; such modifications or replacements do not depart the essence of the corresponding technical solution from the scope of the technical solutions of embodiments of the present invention.

The invention claimed is:

1. A positioning assist device, comprising:
a first fixator installed on a front wheel on one side of an automobile;
a second fixator installed on a rear wheel on one side of the automobile, the first fixator and the second fixator being located on a same side of the automobile;
a first connecting rod connected between the first fixator and the second fixator, wherein a vertical plane, where a center line in a lengthwise direction of the first connecting rod is located, is parallel to a center axis plane of the automobile;
a second connecting rod disposed perpendicular to the first connecting rod;
a horizontal reference rod installed on the second connecting rod and rotatable about the second connecting rod, wherein a horizontal plane, where the center line in the lengthwise direction of the horizontal reference rod is located, is perpendicular to the horizontal plane where the center line in the lengthwise direction of the first connecting rod is located;
and a laser device movably installed on the horizontal reference rod, the laser device being used for emitting laser light downwards to form a laser line on an object located below the laser device, and a horizontal angle of the laser device relative to the first connecting rod being adjustable to be an angle, relative to the center axis plane of the automobile, of an energy receiving and transmitting surface of a radar assembly to be installed when the radar assembly to be installed is installed on one side of the automobile, wherein the horizontal angle of the laser device relative to the first connecting rod is the angle between a direction of the laser line emitted by the laser device and the center line along the lengthwise direction of the first connecting rod in the horizontal plane where the center line along the lengthwise direction of the first connecting rod is located.

2. The positioning assist device according to claim 1, wherein
the laser device is horizontally rotatable relative to the horizontal reference rod.

3. The positioning assist device according to claim 2, wherein
the laser device may slide along the center line in the lengthwise direction of the horizontal reference rod.

4. The positioning assist device according to claim 3, wherein
the positioning assist device further comprises a second locking mechanism for locking the laser device relative to the horizontal reference rod to limit a movement of the laser device relative to the horizontal reference rod.

5. The positioning assist device according to claim 4, wherein
the second locking mechanism comprises a locking plate, a second locking bolt, and a second locking nut, wherein the locking plate is fixed to the laser device, the locking plate is provided with an arc-shaped hole for the second locking bolt to pass through, the horizontal reference rod is provided with a sliding groove for the second locking bolt to pass through, and the second locking nut is used for cooperating with the second locking bolt after the second locking bolt passes through the arc-shaped hole and the sliding groove;
wherein the second bolt can slide in an arc direction of the arc-shaped hole, and a sum of radians of the arc-shaped holes is greater than or equal to 180 degrees.

6. The positioning assist device according to claim 5, wherein
a sliding block is sleeved on the horizontal reference rod, the sliding block can slide along the lengthwise direction of the horizontal reference rod, a second via hole through which the second locking bolt passes is provided on the sliding block, and the second locking bolt cooperates with the second locking nut after passing through the arc-shaped hole, the second via hole, and the sliding groove;
wherein when the second locking nut is tightened, the second locking nut abuts against the sliding block.

7. The positioning assist device according to claim 5, wherein
a second arc-shaped scale is provided on the arc-shaped hole, and a second reference indication line is provided on the second locking bolt.

8. The positioning assist device according to claim 1, wherein
the horizontal reference rod is slidable relative to the second connecting rod along the lengthwise direction of the second connecting rod.

9. The positioning assist device according to claim 8, wherein the horizontal reference rod comprises a moving part and a rotating part extending vertically from the moving part, the moving part is sleeved on the second connecting rod, the moving part can slide relative to the second connecting rod along the lengthwise direction of the second connecting rod, the rotating part can rotate relative to the second connecting rod, and the laser device is movably installed on the rotating part.

10. The positioning assist device according to claim 9, wherein the positioning assist device comprises a first locking mechanism, wherein the first locking mechanism can lock the horizontal reference rod relative to the second connecting rod to limit a movement of the horizontal reference rod relative to the second connecting rod.

11. The positioning assist device according to claim 10, wherein the first locking mechanism comprises a locking ring, a first locking bolt, and a first locking nut;

two ends of the locking ring are provided with a first via hole and a first through hole through which the first locking bolt passes, the first locking ring is sleeved on the moving part, and the first locking nut is used for cooperating with the first locking bolt after the first locking bolt passes through the first via hole and the first through hole.

12. The positioning assist device according to claim 1, wherein at a junction of the horizontal reference rod and the second connecting rod, one of the horizontal reference rod and the second connecting rod is provided with a first arc-shaped scale, and the other is provided with a first reference indication line.

13. The positioning assist device according to claim 1, wherein the first fixator comprises a first installation seat and two first claw assemblies, wherein the two first claw assemblies are clamped on a hub of the front wheel, the first installation seat is located at center positions of the two first claw assemblies, and a first end of the first fixing rod is installed on the first installation seat;

the second fixator comprises a second installation seat and two second claw assemblies, wherein the second installation seat is located at the center positions of the two second claw assemblies, the two second claw assemblies are clamped to the hub of the rear wheel, and a second end of the first fixing rod is installed on the second installation seat.

14. A positioning assist method, comprising the positioning assist device according to claim 1, wherein the method comprises:

adjusting the first fixator and the second fixator to ensure that the vertical plane, where the center line in the lengthwise direction of the first connecting rod is located, is parallel to the center axis plane of the automobile;

rotating the laser device until the direction of the laser line of a laser light emitted by the laser device on the horizontal reference rod is parallel to the center line of the lengthwise direction of the horizontal reference rod;

rotating the horizontal reference rod until the direction of the laser line of the laser light emitted by the laser device on the first connecting rod is parallel to the center line of the lengthwise direction of the first connecting rod, and denoting this position as a zero point position;

acquiring an installation angle and an installation direction of the energy receiving and transmitting surface of the radar assembly to be installed relative to the center axis plane of the automobile when the radar assembly to be installed is installed on one side of the automobile; and according to the installation direction and the installation angle, adjusting the horizontal reference rod so that an included angle between the horizontal reference rod and the first connecting rod is the same as the installation angle, and a deflection direction of the horizontal reference rod relative to the first connecting rod is the same as the installation direction, wherein the first connecting rod and an adjusted horizontal reference rod are used to assist in installing the radar assembly to be installed.

15. The method according to claim 14, further comprising:

a step of according to the installation direction and the installation angle, adjusting the horizontal reference rod so that an included angle between the horizontal reference rod and the first connecting rod is the same as the installation angle further comprising:

horizontally rotating the laser device in a direction opposite to the installation direction by the installation angle; and rotating the horizontal reference rod until the direction of the laser line of the laser light emitted by the laser device on the first connecting rod is parallel to the center line of the lengthwise direction of the first connecting rod.

* * * * *